United States Patent
Miyata et al.

(10) Patent No.: US 7,892,683 B2
(45) Date of Patent: Feb. 22, 2011

(54) FUEL CELL SYSTEM

(75) Inventors: Koichiro Miyata, Saitama (JP); Kenichiro Ueda, Saitama (JP); Chihiro Wake, Saitama (JP); Junji Uehara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1096 days.

(21) Appl. No.: 11/365,917

(22) Filed: Mar. 2, 2006

(65) Prior Publication Data

US 2006/0199052 A1 Sep. 7, 2006

(30) Foreign Application Priority Data

Mar. 3, 2005 (JP) .............................. 2005-059170

(51) Int. Cl.
  *H01M 8/04* (2006.01)
(52) U.S. Cl. ....................................... 429/429; 429/442
(58) Field of Classification Search ....................... None
  See application file for complete search history.

(56) References Cited

U.S. PATENT DOCUMENTS

2004/0115495 A1 * 6/2004 Asai et al. ..................... 429/22

FOREIGN PATENT DOCUMENTS

| JP | 2003-115314 | * | 4/2003 |
| JP | 2003-203665 |   | 7/2003 |

* cited by examiner

*Primary Examiner*—Jonathan Crepeau
(74) *Attorney, Agent, or Firm*—Squire, Sanders & Dempsey (US) LLP (57) ABSTRACT

There is provided a fuel cell for generating a electric power by a reaction of a reaction gas, a reaction gas flow path through which the reaction gas passes, purge section for purging the reaction gas flow path with a purging gas, a purge judging section for judging as to whether or not a purging operation by the purge section is required, and a failure detecting section for detecting a failure of a judgment support device. When the failure of the judgment support device is detected by the failure detecting section, the reaction gas flow path is purged by the purge section when stopping the power generation of the fuel cell.

8 Claims, 5 Drawing Sheets

FUEL CELL SYSTEM

The present invention claims foreign priority to Japanese patent application no. 2005-059170, filed on Mar. 3, 2005, the subject matter of which is incorporated herein by reference.

BACKGROUND OF THE INVENTION

1. Field of the Invention

The present invention relates to a fuel cell system operable in a low temperature starting mode.

2. Description of the Related Art

Recently, a fuel cell vehicle employing a fuel cell as a drive source is being proposed. In such a fuel cell, a structure of a predetermined number of unit cells being stacked is known. Each unit cells has an anode, a cathode and an electrolytic film interposed between the anode and the cathode. The fuel cell generates electric power by an electrochemical reaction between hydrogen conducted to the anode and oxygen conducted to the cathode, thereby water is produced. Although this water is mainly produced in the cathode while the fuel cell is operated, there are some possibilities that the water in the cathode move to the anode via the electrolytic film interposed between the cathode and the anode.

When stopping a power generation of the fuel cell, the above-explained water and also humidified water are left within gas flow paths of the fuel cell. Under a low temperature condition, if the power generation of the fuel cell is stopped while such remaining water is left as it is, then the remaining water will freeze, and thus, supplying and exhausting operations of the reaction gases (hydrogen and air) will be disturbed. As a result, a low temperature starting characteristic of the fuel cell is lowered.

To solve the above-described problem, Japanese Patent Unexamined Publication JP-A-2003-203665 proposes to perform the purge process operation to one or both of the anode and the cathode when stopping the power generation of the fuel cell.

However, in a case where the fuel cell is exposed to such a low temperature environment lower than the freezing point or nearly equal to the freezing point, after stopping the power generation of the fuel cell until starting the power generation again, water vapor left in the fuel cell system is condensed. If power generation of the fuel cell is carried out under this condition, then there is such a problem that an efficiency of this power generation is lowered, and the electric power is generated under unstable condition.

SUMMARY OF THE INVENTION

It is, therefore, an object of the present invention to provide a fuel cell system capable of stabilizing generation of electric power by a fuel cell even when the fuel cell is exposed under a low temperature environment.

According to a first aspect of the present invention, it is preferable that a fuel cell system include a fuel cell for generating an electric power by a reaction of a reaction gas, a reaction gas flow path (for example, hydrogen supply flow path 3 and air supply flow path 6 in the embodiment) through which the reaction gas passes, a purge judging section (for example, ECU in the embodiment) for judging whether or not to purge the reaction gas flow path based on a condition of the fuel cell a judgment support device employed for the purge judging section to carry out a judgment, a purge section (for example, timer 16, energy storage 22 and temperature sensor 13 in the embodiment) for purging the reaction gas flow path with a purging gas based on the judgment of the purge judging section, and a failure detecting ///section (for example, ECU 12 in the embodiment) for detecting a failure of the judgment support device. When stopping the power generation of the fuel cell, said purge section purges the reaction gas flow path with a purging gas further in case of the failure of the judgment support device being detected by the failure detecting section.

Therefore, when the failure of the judgment support device is detected by the failure detecting section, the reaction gas flow path is purged by the purge section when stopping the power generation of the fuel cell, so that the remaining water left in the reaction gas flow path can be exhausted. As a result, it is possible to suppress that the remaining water within the reaction gas flow path are condensed while the power generation of the fuel cell is stopped. As a consequence, even when the judgment as to the purge request for the purge judging section is erroneously made, and thus, the purging process operation while the power generation of the fuel cell is stopped is uncertainly carried out, since it is possible to suppress that the remaining water within the reaction gas flow path are condensed while the power generation of the fuel cell is stopped, the subsequent initiation of the fuel cell can be carried out under stable condition.

According to a second aspect of the present invention, as set forth in the first aspect of the present invention, it is preferable that the fuel cell system further include a monitor section (for example, timer 16 in the embodiment) for monitoring the fuel cell during a predetermined period of time after the power generation of the fuel cell being stopped, and a monitor initiating device (for example, ECU 12 in the embodiment) for initiating the monitor section. The failure detecting section further detects a failure of the monitor initiating device, while said purge section purges the reaction gas flow path further based on a monitoring result of the monitor section.

Therefore, when the failure of the monitor initiating device is detected, the purging operation by the purge section is carried out when stopping the power generation of the fuel cell. Even in such a case that the failure occurs by the monitor initiating device and thus the monitoring operation of the fuel cell becomes uncertain, since it is possible to suppress that the remaining water are condensed while the power generation of the fuel cell is stopped, the subsequent initiation of the fuel cell can be carried out under stable condition.

According to a third aspect of the present invention, as set forth in the first aspect of the present invention, it is preferable that the fuel cell further include a sensing device (for example, external temperature sensor 21 in the embodiment) from which whether or not the fuel cell is cooled down to a predetermined temperature after the power generation of the fuel cell being stopped can be determined. The purge section purges the reaction gas flow path further based on the determination made from the sensing device with the failure of the judgment support device being detected by the failure detecting section.

Therefore, even when the failure of the judgment support device is sensed, since sensing device judges as to whether or not the fuel cell is cooled until next initiating operation, a necessity of purging of the fuel cell can be judged by the purge judging section. As a consequence, even when the purge judgment made based upon the purge judging section becomes uncertain, the control operation for performing the purging operation when the purging operation of the fuel cell is required can be carried out in predetermined precision. As a result, a total number of the purging operations can be reduced by this control operation, so that energy consumption can be reduced.

According to a fourth aspect of the present invention, as set forth in the first aspect of the present invention, it is preferable that the fuel cell system further include a fuel cell initiating device for initiating the fuel cell, and a power storage section (for example, energy storage 22 in the embodiment) for supplying an electric power to the fuel cell initiating device when initiating the fuel cell. The failure detecting section further detects a failure of the fuel cell initiating device. The purge section purges the reaction gas flow path further based on a remaining capacity of the power storage section.

Therefore, since the necessity of the purging operation is judged in response to the remaining capacity of the power storage section, the purging operation can be carried out when stopping the power generation of the fuel cell, and thereafter the electric power required for initiating the fuel cell is secured. As a result, the fuel cell can be firmly initiated after the power generation of the fuel cell being stopped.

According to a fifth aspect of the present invention, as set forth in the first aspect of the present invention, it is preferable that the reaction gas flow path include a reaction gas through path for a hydrogen gas.

According to a sixth aspect of the present invention, as set forth in the first aspect of the present invention, it is preferable that the reaction gas flow path include a reaction gas through path for an air including oxygen.

According to a seventh aspect of the present invention, as set forth in the first aspect of the present invention, it is preferable that the judgment support device include a temperature sensor.

According to an eighth aspect of the present invention, as set forth in the seventh aspect of the present invention, it is preferable that the temperature sensor is connected to the fuel cell.

According to a ninth aspect of the present invention, as set forth in the seventh aspect of the present invention, it is preferable that the temperature sensor is connected to the reaction gas flow path.

According to a tenth aspect of the present invention, as set forth in the seventh aspect of the present invention, it is preferable that the fuel cell system further include a coolant path through which a coolant passes, and the temperature sensor is connected to the coolant path.

According to an eleventh aspect of the present invention, as set forth in the third aspect of the present invention, it is preferable that the sensing device includes an external temperature sensor.

According to a twelfth aspect of the present invention, it is preferable that a purging method for a fuel cell system include steps of detecting a failure of a judgment support device provided for carrying out a judgment to purge a reaction gas, and purging a gas flow path with a purging gas based on a condition of the fuel cell. When stopping the power generation of the fuel cell, said purging step is performed further in case of the failure of the judgment support being detected.

According to a thirteenth aspect of the present invention, as set forth in the twelfth aspect of the present invention, it is preferable that said purging method further include step of monitoring the fuel cell during a predetermined period of time after the power generation of the fuel cell being stopped. The detecting step further detects a failure of a monitor initiating device, the monitor initiating device being provided for initiating the monitoring step, while said purging step is performed further based on a monitoring result of the monitoring step.

According to a fourteenth aspect of the present invention, as set forth in the twelfth aspect of the present invention, it is preferable that said purging method further include step of determining whether or not the fuel cell is cooled down to a predetermined temperature after the power generation of the fuel cell being stopped, and the purging step be performed further based on a determination made in the determining step.

According to a fifteenth aspect of the present invention, as set forth in the twelfth aspect of the present invention, it is preferable that the detecting step further detect a failure of a fuel cell initiating device, the fuel cell initiating device being provided for initiating the fuel cell. The purging step is performed further based on a remaining electric power stored for the fuel cell initiating device.

According to a sixteenth aspect of the present invention, as set forth in the twelfth aspect of the present invention, it is preferable that said purging step purge the gas flow path for an air including oxygen.

According to a seventeenth aspect of the present invention, as set forth in the twelfth aspect of the present invention, it is preferable that said purging step purge the gas flow path for a hydrogen gas.

According to an eighteenth aspect of the present invention, as set forth in the twelfth aspect of the present invention, it is preferable that said purging method further include step of checking whether or not the gas flow path is purged.

According to a nineteenth aspect of the present invention, as set forth in the eighteenth aspect of the present invention, it is preferable that the checking step check the time of the gas flow path being purged.

According to a twentieth aspect of the present invention, as set forth in the eighteenth aspect of the present invention, it is preferable that the checking step check a difference of pressure at a gas supply path and a gas exhaust path.

DESCRIPTION OF THE PREFERRED EMBODIMENTS

A fuel cell system according to an embodiment of the present invention will be described below with reference to the drawings. In the embodiment, a description is made of such a case that the fuel cell system corresponds to a fuel cell vehicle which mounts a fuel cell 1 as a drive source.

Figure 1:
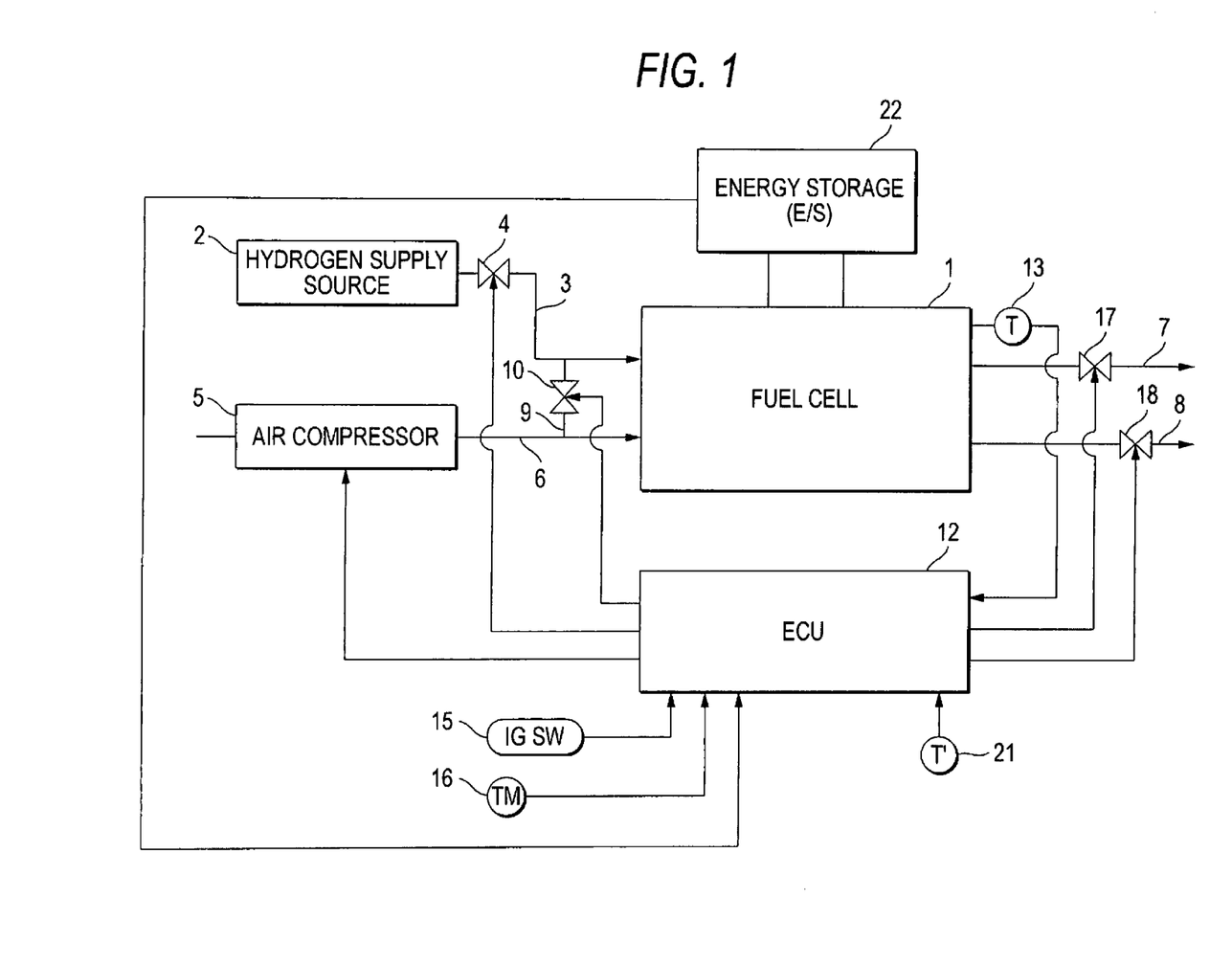
FIG. 1 shows an entire structural diagram of a fuel cell system according to an embodiment of the present invention.

FIG. 1 is a block diagram for showing an arrangement of the fuel cell system according to an embodiment of the present invention.

The fuel cell 1 is constructed by stacking a plurality of cells with each other, while one cell is manufactured by sandwiching a solid polymer electrolytic film between an anode and a cathode from both sides of this electrolytic film. The solid polymer electrolytic film is made of, for instance, a solid polymer ion-exchange film or the like.

As a fuel, hydrogen is supplied to the anode of the fuel cell 1 which is constructed in the above-explained manner, and air containing oxygen is supplied to the cathode of the fuel cell 1 as an oxidizing agent. As a result, hydrogen ions which are produced by catalytic reactions on the anode pass through the electrolytic film and are then moved to the cathode, and are electrochemically reacted with oxygen on the cathode so as to generate electric power. When the electric power is generated, water is produced. At this time, a portion of water produced on the side of the cathode is inversely spread via the electrolytic film on the side of the anode, so that the produced water is also present on the side of the anode.

Hydrogen which is supplied from a hydrogen supply source 2 such as a hydrogen tank passes through the hydrogen supply flow path 3 via a cutoff valve 4, and then, is supplied to the anode of the fuel cell 1.

On the other hand, air is compressed by an air compressor 5, and this compressed air is fed to an air supply flow path 6, and then, is supplied to the cathode of the fuel cell 1.

Also, the hydrogen supply path 3 and the air supply path 6 are connected to each other via a merging flow path 9. While an open-close valve 10 is provided in the margin flow path 9, since opening and closing operations of the open-close valve 10 are controlled, it is possible to allow, or avoid that reaction gases (hydrogen and air) flowing through the hydrogen and air supply flow paths 3 and 6 respectively are merged with each other.

Both hydrogen and air supplied to the fuel cell 1 are used so as to generate electronic power, and thereafter are exhausted as off gases to a hydrogen exhaust flow path 7 and an air exhaust flow path 8 from the fuel cell 1 in combination with remaining water present on the side of the anode, for example, produced water.

A hydrogen purge valve 17 is provided in the hydrogen exhaust flow path 7, and an air purge valve 18 is provided in the air exhaust flow path 8. When these purge valves 17 and 18 are opened, hydrogen and air which are the reacted off gases, and the remaining water are exhausted from the hydrogen exhaust flow path 7 and the air exhaust flow path 8. It should be understood that although hydrogen exhausted from the hydrogen exhaust flow path 7 is diluted up to concentration lower than, or equal to predetermined concentration by a dilution box (not shown), a detailed explanation thereof is omitted.

Also, an energy storage (E/S) 22 is connected to the fuel cell 1, while the energy storage (E/S) 22 corresponds to such an electricity storing means as a battery and a capacitor. This energy storage 22 charges the electric power generated from the fuel cell 1, and supplies electric power to an appliance (for example, ECU 12, air compressor 5 etc.) which is required to operate the fuel cell 1 when the power generation of the fuel cell 1 is stopped.

A control unit (ECU) 12 which controls various sorts of appliances is provided in the fuel cell system.

An ignition switch 15, a timer 16, and the energy storage 22 are connected to this ECU 12. An ignition ON (IG-ON) signal and an ignition OFF (IG-OFF) signal are entered from the ignition switch 15 to the ECU 12. A measured time instant signal is inputted from the timer 16 to the ECU 12. Also, a signal as to an energy remaining amount is entered from the energy storage 22 is inputted to the ECU 12.

Further, the fuel cell system is equipped with a temperature sensor 13 connected to the fuel cell 1, and another temperature sensor 21 for measuring an external temperature. Then, temperatures T and T', which are detected by the temperature sensors 13 and 21 respectively, are entered to the ECU 12 as a temperature T of the fuel cell 1, and an external temperature T', respectively.

Then, the ECU 12 outputs signals which drive the air compressor 5, the cutoff valve 4, the open-close valve 10, and the purge valves 17, 18 based upon the detected values and the signals, which are entered to this ECU 12.

Figure 2:
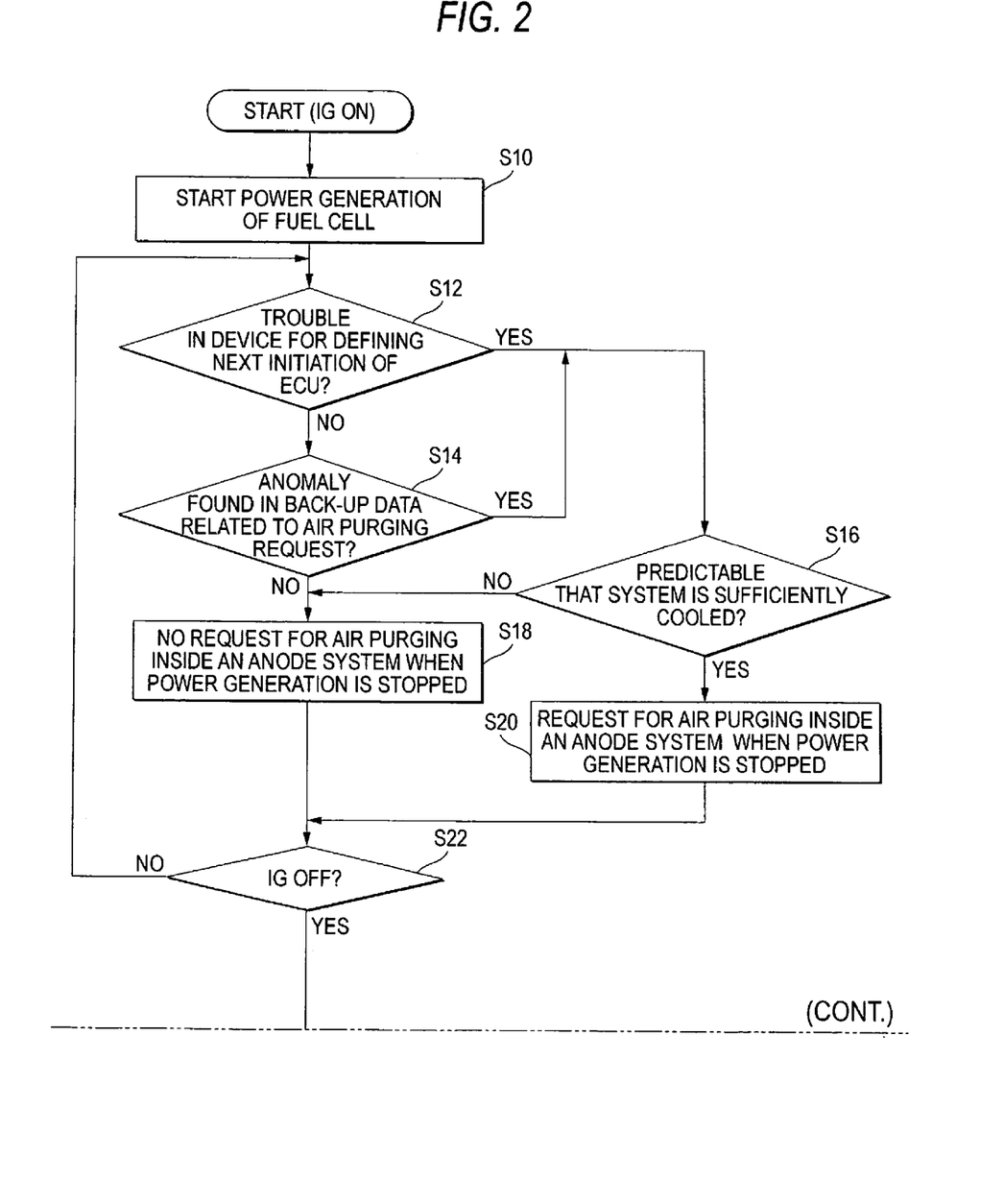
FIG. 2 is a main flow chart for describing purge control process operations of a fuel cell indicated in FIG. 1.
Figure 3:
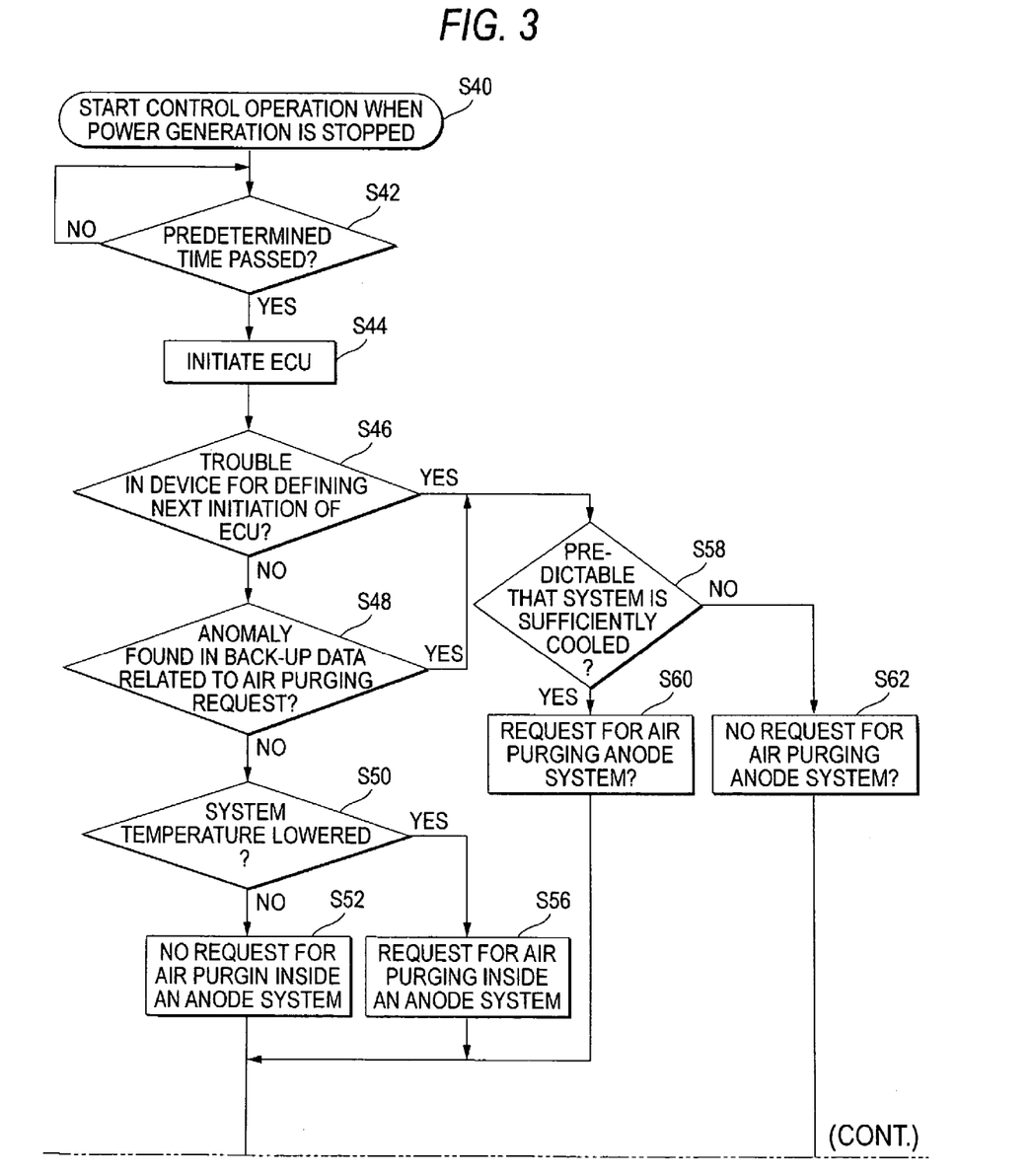
FIG. 3 is a sub-flowchart for describing process of purging flow operations shown in FIG. 2.

Operations of the fuel cell system constructed in the above-explained manner will now be described with reference to FIG. 2 and FIG. 3. FIG. 2 is a flow chart for describing a purge control process operation of the fuel cell 1 shown in FIG. 1. FIG. 3 is a sub-flow chart for describing contents of the control process operations when power generation is stopped, which are shown in the flow chart of FIG. 2.

First, when the ignition switch 15 is turned ON, a power generating process operation of the fuel cell 1 is commenced in a step S10 of FIG. 2. Concretely speaking, the cutoff valve 4 is opened so as to supply hydrogen from the hydrogen supply source 2 via the hydrogen supply flow path 3 to the anode of the fuel cell 1, and the air compressor 5 is actuated so as to supply air via the air supply flow path 6 to the cathode of the fuel cell 1.

Next, in a step S12, a judgment is made as to whether or not there is any trouble in a device which defines a subsequent initiation of the ECU 12. As this device, there are the timer 16, the energy storage 22, and the like, which are required in order to initiate the ECU 12. In the case that the judgment result becomes "YES", the purge control process operation is advanced to a step S16. To the contrary, in the case that the judgment result becomes "NO", the purge control process operation is advanced to a step S14. In the step S14, a judgment is made as to whether or not there is an anomaly found in back-up data related to air purge request. As this back-up data, there are such data which are stored in the ECU 12, and are related to the temperature T of the fuel cell 1 detected by the temperature sensor 13, and to the temperature T', for example, the external temperature. The judging operation of this step S14 may be executed based upon a response when a sensor signal is sent to the ECU 12. When the judgment result of the step S14 becomes "YES", the purge control process operation is advanced to the step S16, whereas when the judgment result of this step S14 becomes "NO", the purge control process operation is advanced to a step S18.

In the step S16, a judgment is made as to whether it is predictable or not that the fuel cell system will sufficiently be cooled after the power generation thereof being stopped. In other words, a check is made as to whether or not there is a risk of water being frozen within the reaction gas flow paths 3 and 6 after the power generation being stopped. In this embodiment, the judgment is carried out as to whether or not detected values of the temperature sensors 13 and 21 become lower than, or equal to a predetermined temperature (for example, 15° C.). It should be understood that when the above-explained predetermined temperature is set by considering environmental information when the judgment of the step S16 is carried out, there is a merit in such a view point that reliability of the judgment is further increased. The environmental information corresponds to timing, weather, a place, and the like when the judgment of the step S16 is executed. In the case that the judgment result of the step S16 becomes "YES", the purge control process operation is advanced to a step S20, whereas in the case that the judgment result of this step S16 becomes "NO", the purge control process operation is advanced to a step S18.

In the step S18, a flag of "no request for air purging inside an anode system when power generation is stopped" is set. Also, in the step S20, a flag of "request for air purging inside an anode system when power generation is stopped" is set. After the step S18 and the step S20, a judgment is made as to whether or not the ignition switch 15 is turned OFF. When the judgment result of the step S22 becomes "YES", the purge control process operation is advanced to a step S24, whereas when the judgment result of this step S22 becomes "NO", the purge control process operation is returned to the step S12. In other words, when the power generation of the fuel cell 1 is continued, the above-explained process operations after the step S12 are repeatedly executed.

When the judgment result of the step S22 becomes "YES", the cutoff valve 4 is closed in order to stop the power generation of the fuel cell 1, so that the supply of hydrogen to the anode of the fuel cell 1 is cut off. Subsequently, in a step S26, a check is made as to whether or not the flag of "request for air purging inside an anode system when power generation is stopped" is set. When the judgment result of the step S26 becomes "YES", the purge control process operation is advanced to a step S32, whereas when the judgment result of this step S26 becomes "NO", the purge control process operation is advanced to a step S28. In the step S32, a judgment is made as to whether or not a charged amount of the energy storage (E/S) 22 is larger than, or equal to a predetermined electric power amount. This electric power amount is set by judging as to whether or not when an air purging operation of the anode system is carried out, electric power required during next initiating operation can be secured. In the case that the judgment result of the step S32 becomes "YES", the purge control process operation is advanced to a step S34, whereas in the case that the judgment result of this step S32 becomes "NO", the purge control process operation is advanced to a step S38.

In the step S34, an air purging operation of the anode system is carried out. That is, while the actuation of the air compressor 5 is contained, the open-close valve 10 is opened so as to supply air which is compressed and fed by the air compressor 5 via the merging flow path 9 to the hydrogen supply path 3 and the anode of the fuel cell 1. At this time, the hydrogen valve 17 is also opened so as to exhaust air from the hydrogen exhaust flow path 7, while this air is exhausted from the anode of the fuel cell 1.

Then, in a step S36, a check is made as to whether or not the purging process operation is accomplished. This judging operation may be executed by operating the timer 16, or based upon a difference of pressure at the hydrogen supply path 3 and the hydrogen exhaust path 7. In other words, when the pressure difference between the hydrogen supply path 3 and the hydrogen exhaust path 7, it is so predictable that the remaining water is exhausted, and the remaining water may cause a blockage of the flow paths within the fuel cell 1.

In the case that the judgment result of the step S36 becomes "YES", the purge control process operation is advanced to a step S38, whereas in the case that the judgment result of this step S36 becomes "NO", the purge control process operation is returned to the step S34. In other words, the process operation of the step S34 is continuously carried out until the purging process operation is accomplished. In the step S38, the open-close valve 10 is closed and the hydrogen purge valve 17 is closed in order that the actuation of the air compressor 5 is stopped, and a control operation when the power generation is stopped is carried out. Then, the operation of the ECU 12 is stopped so as to accomplish the purge control process operation of this flow chart is ended.

On the other hand, the actuation of the air compressor 5 is stopped, and at this time, the operation of the ECU 12 is also stopped. Then, the purge control process operation is advanced to a control operation when the power generation is stopped in a step S40. Processed contents of this control operation when the power generation is stopped will now be explained by employing the sub-flow chart of FIG. 3.

First, if the control operation when the power generation is stopped is commenced, then a judgment is made as to whether or not a predetermined time has elapsed by the timer 16 in a step S42. When the judgment result of the step S42 becomes "YES", the control operation is advanced to a step S44, whereas when the judgment result of this step S42 becomes "NO", the control operation is returned to the step S42. In other words, the process operation of the step S42 is repeatedly carried out until a predetermined time has elapsed.

In the step S44, the ECU 12 is initiated. Then, similar to the step S12, in a step S46, a judgment is made as to whether or not there is any trouble in a device, which defines a subsequent initiating operation of the ECU 12. In the case that the judgment result of the step S46 becomes "YES", the control operation is advanced to a step S58, whereas in the case that the judgment result of the step S46 becomes "NO", the control operation is advanced to a step S48. Similar to the step S14, in the step S48, a judgment is made as to whether or not there is an anomaly found in back-up data related to an air purge request. In the case that the judgment result of the step S48 becomes "YES", the control operation is advanced to the step S58, whereas in the case that the judgment result of the step S48 becomes "NO", the control operation is advanced to a step S50.

In the step S50, the temperature sensor 13 is initiated so as to measure a temperature T of the fuel cell 1, and a check is made as to whether or not this measured temperature T is lower than, or equal to a predetermined temperature (for example, 5° C.). This predetermined temperature is deferent from the temperature explained in the previous step S16, and is set based upon a view point for checking as to whether or not there is such a risk that water within the reaction gas paths 3 and 6 is frozen until the ECU 12 is initiated in the next time under such a condition that stopping of the power generation of the fuel cell 1 is continued (namely, until predetermined time of step S42 has again passed). In this case, as the above-explained predetermined temperature T, such a temperature is preferably selected to be higher than the freezing point, and be approximated to this freezing point (for example, range from 0° C. to 5° C.). If the predetermined temperature T is set in the above-described manner, then the purging process operation may be carried out while freezing of the remaining water is prevented under such a condition that a major portion of water vapor stored in the fuel cell system is condensed. As a consequence, a purging efficiency can be increased. When the judgment result of the step S50 becomes "YES", the control operation is advanced to a step S56, whereas when the judgment result of this step S50 becomes "NO", the control operation is advanced to a step S52.

In the step S52, a flag of "air purging request within anode system is not present" is set. Also, in the step S56, a flag of "air purging request within anode system is present" is set. After the step S52 and the step S56, in a step S54, a check is made as to whether or not the flag of "air purging request within anode system is present" is set. In the case that the judgment result of the step S54 becomes "YES", the control operation is advanced to a step S64 Also, in the case that the judgment result of the step S54 becomes "NO", the control operation is advanced to a step S55 in which the operation of the ECU 12 is stopped. Thereafter, the control operation is returned to the step S40 in which the control process operation when the power generation is stopped is repeatedly carried out.

In the step S64, similar to the step S32, a judgment is made as to whether or not a charged amount of the energy storage (E/S) 22 is larger than, or equal to the predetermined electric power amount. When the judgment result of the step S64 becomes "YES", the control operation is advanced to a step S68, whereas when the judgment result of this step S64 becomes "NO", the control operation is advanced to a step S66. In this step S66, the operation of the ECU 12 is stopped, and the control operation of this sub-flow chart is accomplished.

In the step S68, the air compressor 5 is actuated so as to perform an air purging operation of the anode system in a similar manner to the step S34. Then, similar to the step S36, in a step S70, a judgment is made as to whether or not the purging process operation is accomplished. In the case that the judgment result of the step S70 becomes "YES", the control operation is advanced to a step S72, whereas in the case that the judgment result of the step S70 becomes "NO", the process operation of this step S70 is repeatedly carried out. In the step S72, the fuel cell system is stopped, and the process operation of this sub-flow chart is ended.

On the other hand, similar to the step S16, in a step S58, a judgment is made as to whether it is predictable or not that the fuel cell system will sufficiently be cooled after the power generation thereof is stopped. In other words, a check is made as to whether or not there is a risk of water being frozen within the reaction gas flow paths 3 and 6 after the power generation being stopped. When the judgment result of the step S58 becomes "YES", the control operation is advanced to a step S60, whereas when the judgment result of this step S58 becomes "NO", the control operation is advanced to a step S62 In the step S60, the flag of "air purging request within anode system is present" is set. The control operation is advanced to the step S54 in which a series of the above-described process operations are carried out. Also, in a step S62, the flag of "air purging request within anode system is not present" is set. Then, the control operation is advanced to the step S66 in which a series of the above-explained process operations are executed.

As previously explained, when the abnormal state of the device which defines the subsequent initiating operation of the ECU 12 is sensed, the purging operation is carried out in the case that the power generation of the fuel cell 1 is stopped, so that the remaining water left in the reaction gas flow paths 3 and 6 can be exhausted. As a result, it is possible to suppress that the remaining water within the reaction gas flow paths 3 and 6 are condensed while the power generation of the fuel cell 1 is stopped. As a consequence, even when the judgment as to the purge request for the device is erroneously made, and thus, the purging process operation while the power generation of the fuel cell 1 is stopped is uncertainly carried out, since it is possible to suppress that the remaining water within the reaction gas flow paths 3 and 6 are condensed while the power generation of the fuel cell 1 is stopped, the subsequent initiation of the fuel cell 1 can be carried out under stable condition.

Although the contents of the present invention is described based upon the above-explained embodiments, the contents of the present invention are not limited only to the above-described embodiments. For instance, the fuel cell system may be employed in a vehicle, or a fixing installation type generator. Alternatively, the purge section of the present invention may purge any one of the anode and the cathode. It should also be understood that the temperature sensor 13 is directly connected to the fuel cell 1 in the above-explained embodiment. Alternatively, the temperature sensor 13 may be built in the fuel cell 1. Also, the temperature sensor 13 may be alternatively connected to a reaction gas flow path (hydrogen exhaust flow path 7, air exhaust flow path 8, or the like) Furthermore, the temperature sensor 13 maybe alternatively connected to a coolant flow path used to cool the fuel cell 1.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A purging method for a fuel cell system, comprising:
    measuring, using a timer, whether a predetermined time is elapsed while a power generation of a fuel cell is stopped;
    initiating a control unit using electric power from a power storage section when the predetermined time is elapsed, wherein the power storage section is charged with the electric power that is generated by the fuel cell;
    measuring a temperature of at least one of the fuel cell and a reaction gas flow path;
    determining whether a failure of at least one of the timer and the power storage section exists;
    when it is determined that the failure does not exist,
        determining, using the control unit, whether the temperature is lower than a first predetermined temperature, wherein the first predetermined temperature is set based on a viewpoint that there is a risk that water inside the reaction gas flow path is frozen by the time of a next initiation of the control unit under a condition that the power generation of the fuel cell is continuously stopped; and
        purging the reaction gas flow path with a purging gas if the temperature is lower than the first predetermined temperature,
    when it is determined that the failure exists,
        judging that the next initiation of the control unit cannot be established; and
        purging, when stopping the power generation of the fuel cell, the reaction gas flow path when the failure exists and when the temperature is lower than a second predetermined temperature which is higher than the first predetermined temperature, wherein the second predetermined temperature is set in consideration of environmental information.

2. The purging method for a fuel cell system according to claim 1,
    wherein the purging of the reaction gas flow path removes condensed water and water vapor from the fuel cell system.

3. The purging method for a fuel cell system according to claim 1, further comprising:
    determining whether a remaining electric power in the power storage section is equal to or larger than a predetermined electric power amount,
    wherein the purging is performed if the remaining electric power is equal to or larger than the predetermined electric power amount.

4. The purging method for a fuel cell system according to claim 2, wherein said purging purges the gas flow path for air that includes oxygen.

5. The purging method for a fuel cell system according to claim 2, wherein said purging purges the gas flow path for hydrogen gas.

6. The purging method for a fuel cell system according to claim 1, further comprising:
    checking whether the gas flow path is purged.

7. The purging method for a fuel cell system according to claim 6, wherein the checking further comprises checking the time that the gas flow path is purged.

8. The purging method for a fuel cell system according to claim 6, wherein the checking further comprises checking a difference of pressure at the reaction gas flow path and a gas exhaust path.

* * * * *